United States Patent
Sago et al.

(10) Patent No.: US 12,543,246 B2
(45) Date of Patent: Feb. 3, 2026

(54) HEATER DEVICE

(71) Applicant: DENSO CORPORATION, Kariya (JP)

(72) Inventors: Yasuhiro Sago, Kariya (JP); Kimitake Ishikawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 946 days.

(21) Appl. No.: 17/736,419

(22) Filed: May 4, 2022

(65) Prior Publication Data

US 2022/0264702 A1    Aug. 18, 2022

Related U.S. Application Data

(63) Continuation of application No. PCT/JP2020/039097, filed on Oct. 16, 2020.

(30) Foreign Application Priority Data

Nov. 18, 2019    (JP) .................. 2019-207950

(51) Int. Cl.
*H05B 1/02* (2006.01)
*B60H 1/22* (2006.01)
(Continued)

(52) U.S. Cl.
CPC ............ *H05B 1/0277* (2013.01); *G01D 5/24* (2013.01); *H05B 3/03* (2013.01); *B60H 1/2227* (2019.05); *H05B 2203/032* (2013.01)

(58) Field of Classification Search
None
See application file for complete search history.

(56) References Cited

U.S. PATENT DOCUMENTS

| | | | |
|---|---|---|---|
| 2005/0041375 A1* | 2/2005 | Rosenau | G01D 5/2405 361/524 |
| 2005/0173414 A1* | 8/2005 | Ishii | H01C 1/1406 219/505 |

(Continued)

FOREIGN PATENT DOCUMENTS

| | | |
|---|---|---|
| JP | 2009276821 A | 11/2009 |
| JP | 5904777 B2 | 4/2016 |

(Continued)

OTHER PUBLICATIONS

WO 2017104343 A1 (Oide Hiroyasu) Jun. 22, 2017 [retrieved on Jun. 10, 2025]. Retrieved from Foreign Image and Text database, translation by Clarivate Analytics (Year: 2017).*

(Continued)

*Primary Examiner* — Edward F Landrum
*Assistant Examiner* — Theodore J Evangelista
(74) *Attorney, Agent, or Firm* — Harness, Dickey & Pierce, P.L.C.

(57) ABSTRACT

A heater device includes a heater surface facing one side in a predetermined direction. The heater device includes a transmission electrode and a reception electrode arranged on the other side in the predetermined direction with respect to the heater surface, and an insulation coating layer that covers the transmission electrode and the reception electrode on the one side in the predetermined direction. The transmission electrode and the reception electrode are electrically connected to a contact detection unit, to detect contact or proximity of an object to the heater surface by a change in a capacitance therebetween. The insulation coating layer has a first component part made of an insulating member, and a second component part having a smaller relative permittivity than that of the first component part. The second component part is located between at least one of the transmission electrode or the reception electrode and the heater surface.

14 Claims, 10 Drawing Sheets

(51) Int. Cl.
     *G01D 5/24*        (2006.01)
     *H05B 3/03*        (2006.01)

(56) References Cited

U.S. PATENT DOCUMENTS

| | | | |
|---|---|---|---|
| 2009/0267622 A1* | 10/2009 | Hansen | B60R 21/01532 |
| | | | 324/684 |
| 2016/0039265 A1 | 2/2016 | Ota et al. | |
| 2017/0321902 A1 | 11/2017 | Ishikawa et al. | |
| 2018/0224962 A1 | 8/2018 | Mori | |

FOREIGN PATENT DOCUMENTS

| | | | | |
|---|---|---|---|---|
| JP | 5954235 B2 | 7/2016 | | |
| JP | 2017138644 A | 8/2017 | | |
| JP | 2018128833 A | 8/2018 | | |
| JP | 6447245 B2 | 1/2019 | | |
| JP | 2019184171 A | 10/2019 | | |
| KR | 20180072896 A * | 7/2018 | ............... | H05B 3/34 |
| WO | WO-2017104343 A1 * | 6/2017 | ............... | B60H 1/22 |

OTHER PUBLICATIONS

KR 20180072896 A (Oh Dong Hoon) Jul. 2, 2018 [retrieved on Jun. 11, 2025]. Retrieved from Foreign Image and Text database, translation by Clarivate Analytics (Year: 2018).*

* cited by examiner

HEATER DEVICE

CROSS REFERENCE TO RELATED APPLICATION

The present application is a continuation application of International Patent Application No. PCT/JP2020/039097 filed on Oct. 16, 2020, which designated the U.S. and claims the benefit of priority from Japanese Patent Application No. 2019-207950 filed on Nov. 18, 2019. The entire disclosures of all of the above applications are incorporated herein by reference.

TECHNICAL FIELD

The present disclosure relates to a heater device that radiates heat from a heater surface.

BACKGROUND

A comparative example of a heater device includes a heater main body that generates heat, and a detection electrode configured to detect an approach or contact of a human body with the heater main body on the basis of a change in a capacitance. The heater main body of the heater device may be formed in a thin plate shape.

SUMMARY

According to an aspect of the present disclosure, a heater device is provided with a heater surface facing one side in a predetermined direction and is configured to radiate heat from the heater surface. The heater device includes a transmission electrode and a reception electrode arranged on the other side in the predetermined direction with respect to the heater surface, and an insulation coating layer that covers the transmission electrode and the reception electrode on the one side in the predetermined direction with respect to the transmission electrode and the reception electrode. The transmission electrode and the reception electrode are electrically connected to a contact detection unit that is configured to detect a contact or a proximity of an object to the heater surface by a change in a capacitance between the transmission electrode and the reception electrode. The insulation coating layer has a first component part made of an insulating member having an electrical insulating property, and a second component part having a relative permittivity smaller than a relative permittivity of the first component part. In addition, the second component part is located between the heater surface and at least one of the transmission electrode or the reception electrode. Therefore, it is possible to suppress an undetectable contact or an undetectable proximity of the object to the heater surface due to adhesion of the water, as compared with the comparative example described above.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
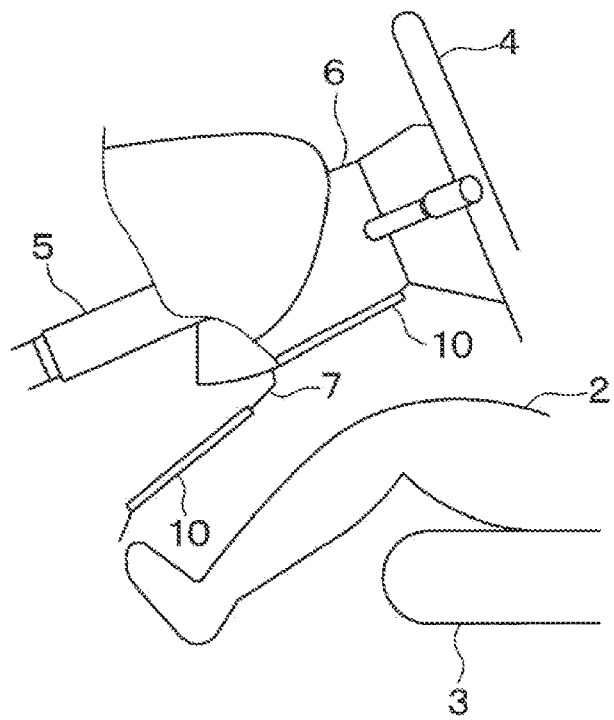
FIG. 1 is a diagram illustrating a state in which a heater device is mounted on a vehicle in a first embodiment.

A heater device may include a heater main body that generates heat, and a detection electrode configured to detect an approach or contact of a human body with the heater main body on the basis of a change in a capacitance. The heater main body of the heater device may be formed in a thin plate shape. In this case, when water comes into contact with the heater main body, the water is quite close to the detection electrode. Therefore, a capacitance detected using the detection electrode changes greatly due to contact with the water, and there is a possibility that an erroneous detection occurs such that even if the human body comes in contact with the heater main body, the contact cannot be detected. The above has been found as a result of detailed studies by the inventors of the present application.

In view of the above points, it is an object of the present disclosure to provide a heater device capable of suppressing an undetectable contact or undetectable proximity of an object with a heater surface, caused due to adhesion of water.

To achieve the above object, according to an exemplar of the present disclosure, a heater device is provided with a heater surface facing one side in a predetermined direction and is configured to radiate heat from the heater surface. In the heater device, a transmission electrode and a reception electrode are electrically connected to a contact detection unit that is configured to detect a contact or a proximity of an object to the heater surface by a change in a capacitance between the transmission electrode and the reception electrode. An insulation coating layer that covers the transmission electrode and the reception electrode on the one side in the predetermined direction is provided with a first component part made of an insulating member having an electrical insulating property, and a second component part having a relative permittivity smaller than a relative permittivity of the first component part. In addition, the second component part is located between the heater surface and at least one of the transmission electrode or the reception electrode.

Thus, the second component part is arranged so as to block an electrical flux line flying between the transmission electrode and the reception electrode. That is, when water adheres to the heater surface, the second component part generates a capacitance in series with the water on the heater surface on the electrical flux line. Thus, in this case, the second component part operates to suppress a change width of the capacitance between the transmission electrode and the reception electrode that increases due to adhesion of the water to the heater surface, as compared with a comparative example in which the insulation coating layer is simply formed by the insulating member. Therefore, it is possible to suppress an undetectable contact or an undetectable proximity of the object to the heater surface due to adhesion of the water, as compared with the comparative example described above.

Hereinafter, embodiments will be described with reference to the drawings. In the following embodiments, the same or equivalent parts are denoted by the same reference numerals in the drawings.

First Embodiment

As illustrated in FIG. 1, a heater device 10 of the present embodiment is installed in a room of a mobile object such as a vehicle. The heater device 10 constitutes a part of a heating device in a vehicle interior. The heater device 10 is an electric heater that generates heat by being supplied with electric power from a power supply device such as a battery or a generator mounted on a mobile object.

The heater device 10 can be used, for example, as a device for promptly providing warmth to an occupant 2 immediately after the vehicle running engine is started. The heater device 10 is installed so as to radiate radiant heat at the feet of the occupant 2 seated on a seat 3 in the vehicle interior. For example, the heater device 10 is installed on a lower surface of a steering column cover 6 provided so as to cover a steering column 5 for supporting a steering wheel 4. The heater device 10 may be installed on a dashboard 7 located below the steering column cover 6.

Figure 2:
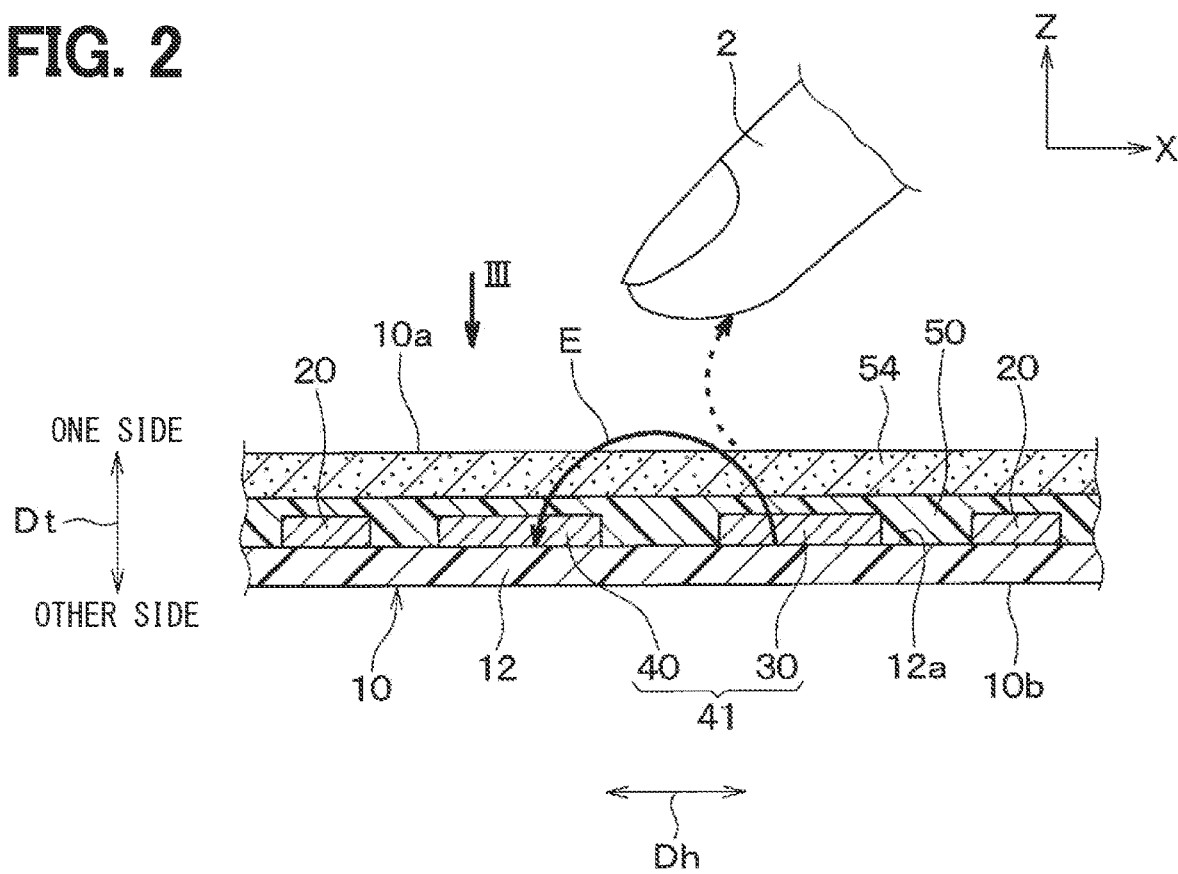
FIG. 2 is a cross-sectional view illustrating a cross section of a part of the heater device cut along a plane along a thickness direction of the heater device in the first embodiment.
Figure 3:
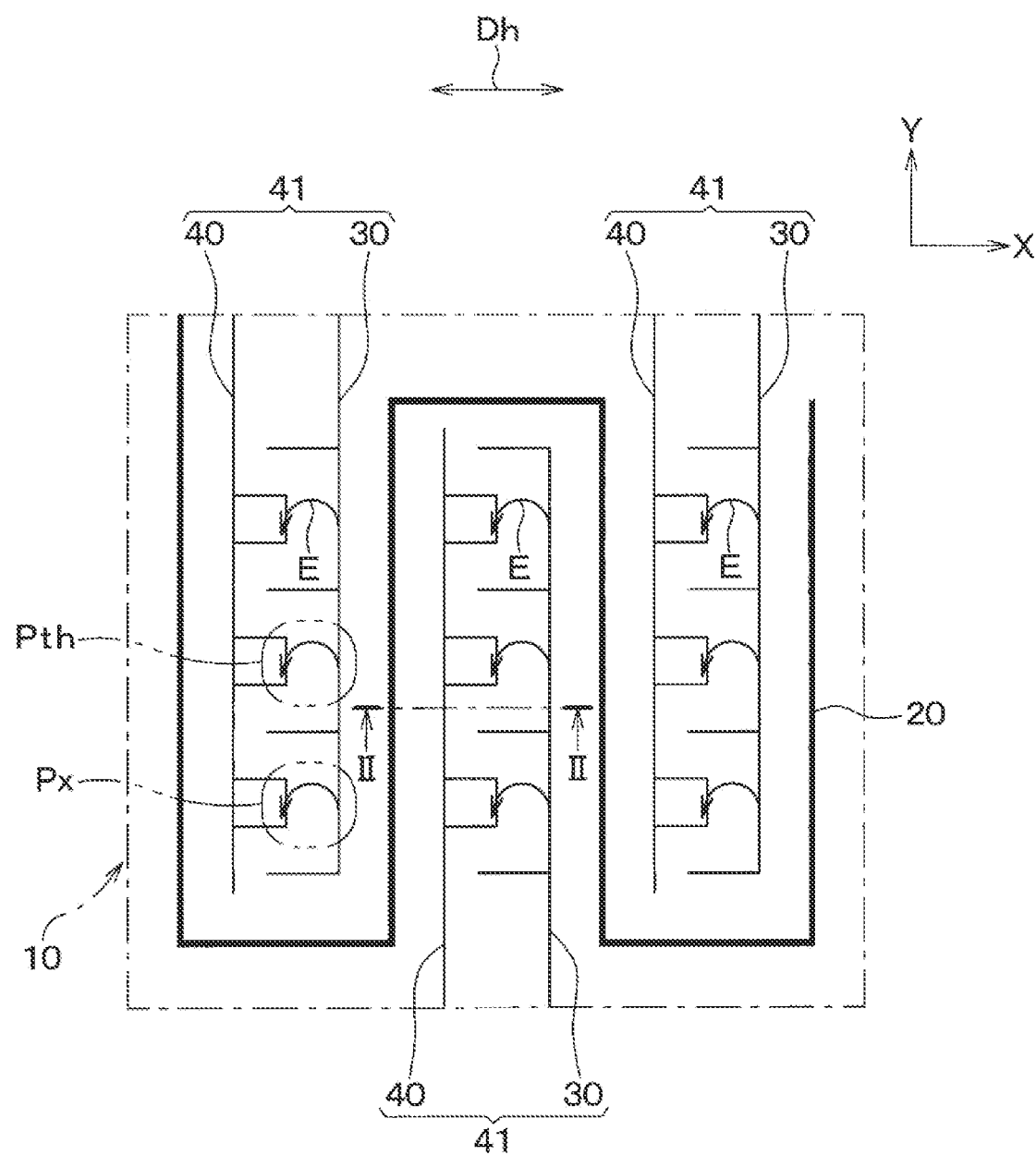
FIG. 3 is a diagram schematically illustrating arrangement of each of a heat generation part, a transmission electrode, and a reception electrode as viewed in a direction facing a heater surface of the heater device, indicated by arrow III of FIG. 2, in the first embodiment.

As illustrated in FIGS. 2 and 3, the heater device 10 is also referred to as a planar heater. The heater device 10 is formed so as to spread in a plane along the X-Y plane defined by an axis X and an axis Y. The heater device 10 has a thickness in the direction of an axis Z. That is, a direction of the axis Z is a thickness direction Dt of the heater device 10. The axes X, Y, and Z are coordinate axes that intersect each other, strictly speaking, coordinate axes that form an orthogonal coordinate system and are orthogonal to each other. In the description of the present embodiment, the thickness direction Dt of the heater device 10 is also referred to as a heater thickness direction Dt as one direction. FIG. 2 is a cross-sectional view illustrating a II-II cross section of FIG. 3.

The heater device 10 of the present embodiment is formed in a substantially rectangular thin plate shape. The heater device 10 has a heater surface 10a provided on one side in the heater thickness direction Dt and a heater back surface 10b provided on the other side in the heater thickness direction Dt. The heater surface 10a faces one side in the heater thickness direction Dt, and the heater back surface 10b faces the other side in the heater thickness direction Dt.

The heater device 10 is fixed to an installation object by, for example, bonding the heater back surface 10b to the installation object that is the steering column cover 6 or the dashboard 7. On the other hand, the heater device 10 radiates radiant heat from the heater surface 10a when energized. By this radiant heat, the heater device 10 warms the occupant 2 as a heating target located opposite to the heater surface 10a.

The heater device 10 includes an insulating substrate 12, a heat generation part 20, a transmission electrode 30, a reception electrode 40, an insulating layer 50, an insulation coating layer 54, and the like.

The insulating substrate 12 is formed in a plate shape by a resin material having an excellent electrical insulating property and withstanding high temperatures. Specifically, the insulating substrate 12 is formed of a resin film. The insulating substrate 12 has a one-side substrate surface 12a provided on one side in the heater thickness direction Dt and the heater back surface 10b that is the other side substrate surface provided on the other side in the heater thickness direction Dt.

The heat generation part 20 is a heat source in the heater device 10, and is formed by a metal material that generates heat when energized. The heat generation part 20 is provided on one side (in other words, the occupant side) in the heater thickness direction Dt with respect to the insulating substrate 12, and is arranged so as to come into contact with the one-side substrate surface 12a. Specifically, the heat generation part 20 is arranged on the one-side substrate surface 12a of the insulating substrate 12 so as to meander and extend while being folded back at predetermined intervals.

Figure 4:
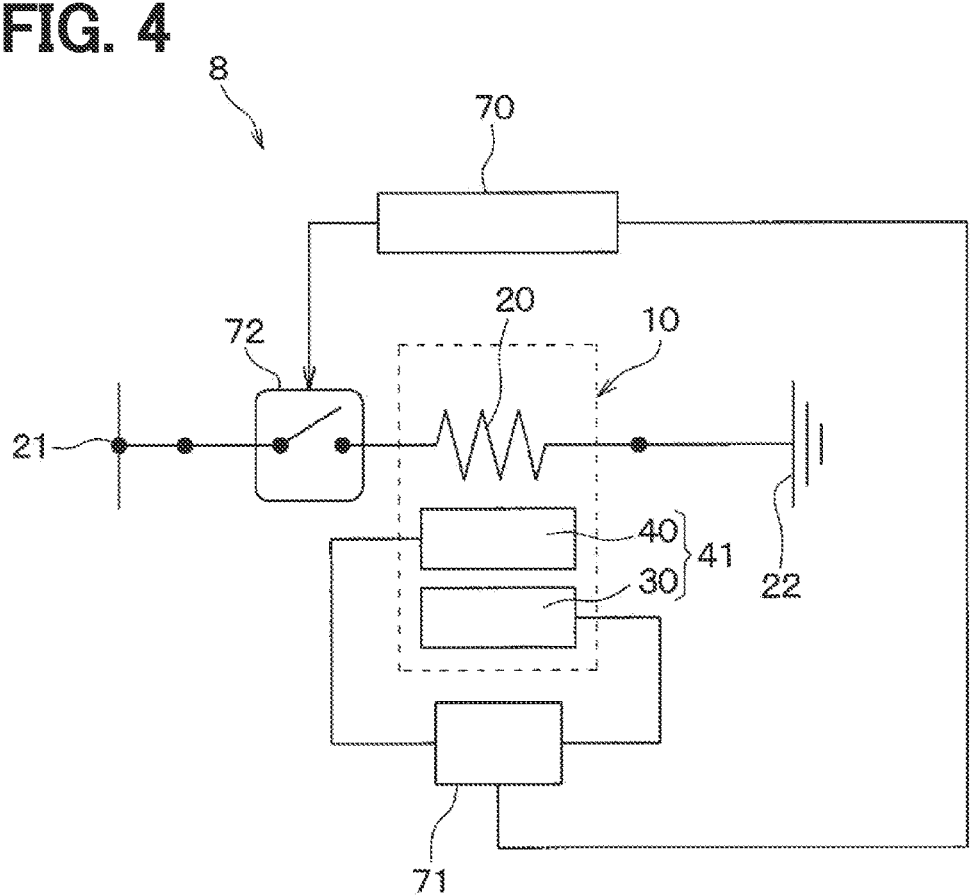
FIG. 4 is a circuit diagram including the heater device, a detection circuit, and a control device in the first embodiment.

As illustrated in FIG. 4, the heat generation part 20 is controlled to be energized by a control device 70. The control device 70 includes a processor that performs control processing and arithmetic processing, a microcomputer that includes a storage unit such as a ROM and a RAM that store programs, data, and the like, and a peripheral circuit thereof. The storage unit includes a non-transitional and substantive storage medium.

The control device 70 controls energizing of the heat generation part 20 on the basis of a signal transmitted from a detection circuit 71 and a signal transmitted from a temperature sensor, which is not illustrated, provided in the heater device 10, or the like. In order to control the heater device 10 to a predetermined target temperature, the control device 70 controls energizing of the heat generation part 20 by on-off control or duty control. For example, the control device 70 controls operation of a switch 72 provided in a middle of wiring connecting a power supply 21, the heat generation part 20, and ground 22, and adjusts the heater device 10 to the predetermined target temperature. The control device 70, the detection circuit 71, the switch 72, and the heater device 10 together constitute a heater system 8. The ground 22 is provided as a ground potential point, and for example, in the present embodiment, the vehicle body or a portion electrically connected to the vehicle body and having the same potential, or the like corresponds to the ground 22.

As illustrated in FIGS. 2 and 3, the transmission electrode 30 and the reception electrode 40 are also provided on one side in the heater thickness direction Dt with respect to the insulating substrate 12, and are arranged to come into contact with the one-side substrate surface 12a, similarly to the heat generation part 20. In short, the transmission electrode 30, the reception electrode 40, and the heat generation part 20 are provided on the same layer. In other words, the transmission electrode 30, the reception electrode 40, and the heat generation part 20 are arranged side by side on the one-side substrate surface 12a in a direction along the one-sided substrate surface 12a.

The transmission electrode 30 and the reception electrode 40 form a pair in order to detect that, for example, an object such as the occupant 2 has come into contact with or approaches the heater surface 10a of the heater device 10. The heater device 10 has a plurality of detection electrode parts 41, each of which is a combination of the transmission electrode 30 and the reception electrode 40 forming the pair.

In each of the plurality of detection electrode parts 41, the transmission electrode 30 and the reception electrode 40 forming a pair are arranged side by side in an electrode alignment direction Dh, which is one direction along the heater surface 10a. Moreover, as a whole of the heater device 10, the transmission electrode 30 and the reception electrode 40 are arranged alternately in the electrode alignment direction Dh. Therefore, the plurality of detection electrode parts 41 is also arranged side by side in the electrode alignment direction Dh. The transmission electrode 30 and the reception electrode 40 are arranged so as to be separated from each other.

A heat generation part 20 is provided between each of the plurality of detection electrode parts 41 arranged in the electrode alignment direction Dh.

Describing the positional relationship between each of the heat generation part 20, the transmission electrode 30, and the reception electrode 40 and the heater surface 10a, the heat generation part 20, the transmission electrode 30, and the reception electrode 40 are located on the other side in the heater thickness direction Dt with respect to the heater surface 10a.

As illustrated in FIG. 4, the transmission electrode 30 and the reception electrode 40 are electrically connected to the detection circuit 71. When a pulsed voltage is applied from the detection circuit 71 to the transmission electrode 30, an electric field is formed between the transmission electrode 30 and the reception electrode 40, and a predetermined electric charge is accumulated. The detection circuit 71 is configured as, for example, an electric circuit having an electric component such as a circuit element and a microcomputer.

As illustrated in FIG. 2, when an object such as a finger of the occupant 2 comes into contact with or approaches the heater surface 10a as an occupant side surface of the heater device 10, a part of an electrical flux line E illustrating the electric charge as a virtual line is blocked by that object. Then, the electric field detected by the reception electrode 40 is reduced by the amount blocked by the object, and a capacitance between the transmission electrode 30 and the reception electrode 40 is also reduced.

Thus, the detection circuit 71 of FIG. 4 can detect the contact or proximity of an object by capturing a change in the capacitance between the transmission electrode 30 and the reception electrode 40. In this manner, the detection circuit 71 functions as a contact detection unit that detects contact or proximity of an object with respect to the heater surface 10a by the change in the capacitance between the transmission electrode 30 and the reception electrode 40.

Detection information detected by the detection circuit 71 is transmitted to the control device 70, and the control device 70 controls energizing of the heat generation part 20 on the basis of the detection information. A ground potential of the detection circuit 71 is, for example, the same as a ground potential of the ground 22.

The transmission electrode 30 and the reception electrode 40 illustrated in FIGS. 2 and 3 are formed by a metal material and have a higher thermal conductivity than the insulating substrate 12, the insulating layer 50, and the insulation coating layer 54. Thus, the transmission electrode 30 and the reception electrode 40 have a heat dissipation function of diffusing the heat generated by the heat generation part 20 in the plane direction.

The transmission electrode 30 and the reception electrode 40 are formed in a thin film shape or a linear shape, and have a low heat capacity. Thus, the transmission electrode 30 and the reception electrode 40 have a characteristic that when they come into contact with an object, the temperature of the contacted portion rapidly decreases.

The insulating layer 50 is a sheet-like material having an electrical insulating property. As illustrated in FIG. 2, the insulating layer 50 is provided to be in contact with the heat generation part 20, the transmission electrode 30, and the reception electrode 40 to cover the heat generation part 20, the transmission electrode 30, and the reception electrode 40 on the one-side substrate surface 12a. That is, the insulating layer 50 covers each of the heat generation part 20, the transmission electrode 30, and the reception electrode 40 on one side in the heater thickness direction Dt with respect to the heat generation part 20, the transmission electrode 30, and the reception electrode 40.

The insulating layer 50 is formed by a material having a high insulating property. Examples of the material constituting the insulating layer 50 can include a resin material such as polyimide resin, urethane resin, acrylic resin, epoxy resin, or silicon resin, and the insulating layer 50 of the present embodiment is formed by epoxy resin. The epoxy resin has a relative permittivity εr of about "εr=3 to 4", and the urethane resin has a relative permittivity εr of about "εr=6 to 7".

The insulation coating layer 54 is a sheet-like material having an electrical insulating property. Since the insulation coating layer 54 is an outermost layer of the heater device 10 on one side in the heater thickness direction Dt, a surface of one side of the insulation coating layer 54 in the heater thickness direction Dt becomes the heater surface 10a. That is, the heater surface 10a is formed on one side of the insulation coating layer 54 in the heater thickness direction Dt.

The insulation coating layer 54 is stacked on one side in the heater thickness direction Dt with respect to the insulating layer 50, and is joined to the insulating layer 50 with a resin adhesive or the like. That is, the insulating layer 50 is stacked between each of the heat generation part 20, the transmission electrode 30, and the reception electrode 40, and the insulation coating layer 54.

The insulation coating layer 54 covers, although the insulating layer 50 is interposed therebetween, each of the heat generation part 20, the transmission electrode 30, and the reception electrode 40 on one side in the heater thickness direction Dt with respect to the heat generation part 20, the transmission electrode 30, and the reception electrode 40.

Figure 5:
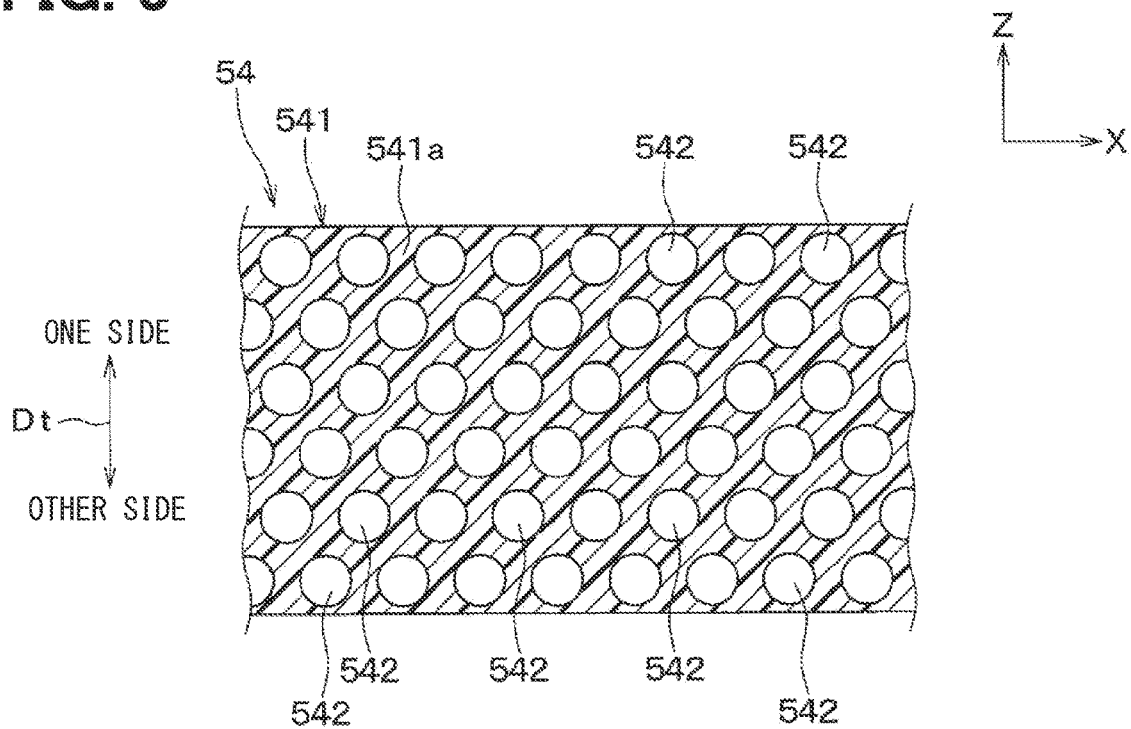
FIG. 5 is a diagram schematically illustrating a cross section of a single insulation coating layer included in the heater device of the first embodiment, in the same illustrating direction as in FIG. 2.

Specifically, as illustrated in FIG. 5, the insulation coating layer 54 has a high relative permittivity part 541 as a first component part and a low relative permittivity part 542 as a second component part with a relative permittivity $\varepsilon r$ smaller than the relative permittivity of the high relative permittivity part 541. The low relative permittivity part 542 is formed in a plurality of parts in the insulation coating layer 54 and is evenly dispersed. The high relative permittivity part 541 is formed by an insulating member 541a having an electrical insulating property.

More specifically, the insulation coating layer 54 of the present embodiment is formed by a foamed resin. Therefore, the insulating member 541a is a resin material in the foamed resin. The low relative permittivity part 542 is formed by air included as a plurality of bubbles in the foamed resin. Thus, as illustrated in FIGS. 2 and 5, the low relative permittivity part 542 is located between each of the transmission electrode 30 and the reception electrode 40 and the heater surface 10a. Since the insulating layer 50 is formed by resin, the relative permittivity $\varepsilon r$ of the low relative permittivity part 542 is smaller than the relative permittivity $\varepsilon r$ of the insulating layer 50.

The material of the insulating member 541a, which is the resin material of the insulation coating layer 54, may be the same as that of the insulating layer 50, or may be different from that of the insulating layer 50.

Unlike the insulation coating layer 54, the insulating layer 50 is not formed by the foamed resin. Therefore, the insulating layer 50 does not have the low relative permittivity part 542. In general terms, the volume ratio of a component of the low relative permittivity part 542 in the insulating layer 50 is smaller than the volume ratio of a component of the low relative permittivity part 542 in the insulation coating layer 54. The component of the low relative permittivity part 542 is a component constituting the low relative permittivity part 542, and thus is air in the present embodiment.

Next, a control process in which the control device 70 controls energizing of the heat generation part 20 on the basis of the detection information from the detection circuit 71 illustrated in FIG. 4 will be described.

When the power of the heater device 10 is turned on, the control device 70 energizes the heat generation part 20. At the same time, the detection circuit 71 applies a predetermined voltage to the transmission electrode 30.

The control device 70 periodically and sequentially determines, for example, whether or not the proximity or contact of an object such as the occupant 2 is detected by the detection circuit 71. As a result of the determination, when the proximity or contact of the object is not detected by the detection circuit 71, the control device 70 maintains a normal state in which the heat generation part 20 is energized with a predetermined current for heating by the heater device 10.

On the other hand, when the detection circuit 71 detects the proximity or contact of the object, the control device 70 lowers the magnitude of current energized to the heat generation unit 20 to be lower than in the normal state, or stops energizing the heat generation part 20. Thus, when an object comes into contact with the heater surface 10a of the heater device 10, the temperature of the contacted portion rapidly drops. Therefore, the heater device 10 of the present embodiment is highly safe.

Figure 6:
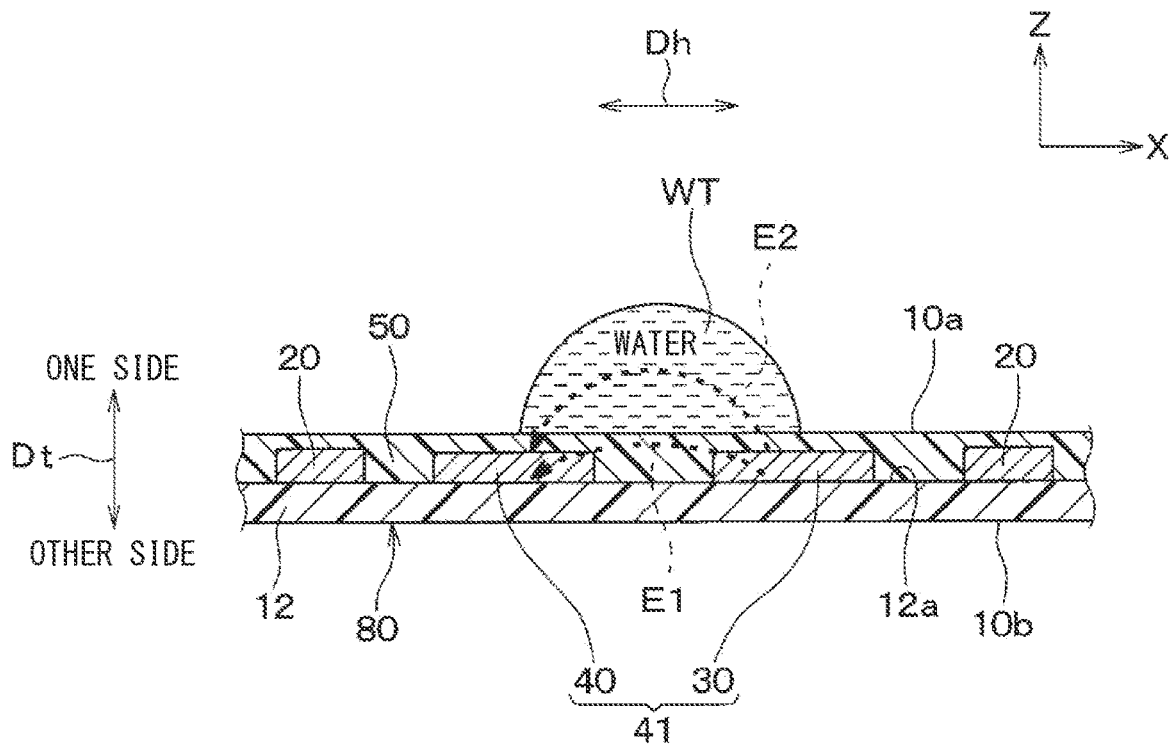
FIG. 6 is a view schematically illustrating a state where water adheres to a heater surface of a heater device of a first comparative example, in a cross-section corresponding to FIG. 2.

Next, a first comparative example for explaining operation and effect of the heater device 10 of the present embodiment including the insulation coating layer 54 will be described. As illustrated in FIG. 6, the heater device 80 of the first comparative example does not include the insulation coating layer 54, and a surface of one side of the insulating layer 50 in the heater thickness direction Dt is the heater surface 10a. Except for this point, the heater device 80 of the first comparative example is the same as the heater device 10 of the present embodiment.

Figure 7:
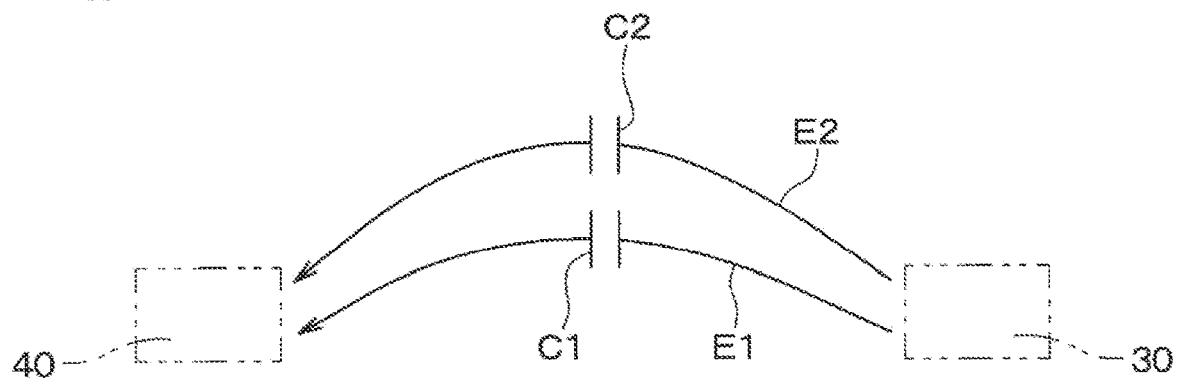
FIG. 7 is a schematic diagram representing a capacitance generated between a transmission electrode and a reception electrode in the heater device of the first comparative example in a state where water adheres as illustrated in FIG. 6.

As illustrated in FIGS. 6 and 7, when water WT, which is a water droplet, adheres to the heater surface 10a in the heater device 80 of the first comparative example, in a first electrical flux line E1 passing through the insulating layer 50, the insulating layer 50 produces a capacitance C1. In addition, on a second electrical flux line E2 passing through the water WT, the water WT produces a capacitance C2.

In this case, the relationship between the capacitance C1 of the insulating layer 50 and the capacitance C2 of the water WT is represented by following Formula F1.

$$C2=(80/3) \times C1 \ldots \quad (F1)$$

Above Formula F1 is derived under conditions that $\varepsilon r1$ that is a relative permittivity $\varepsilon r$ of the insulating layer 50 is "$\varepsilon r1$=approximately 3", and $\varepsilon r2$ that is a relative permittivity $\varepsilon r$ of the water WT is "$\varepsilon r2$=approximately 80". Above Formula F1 is obtained by that the capacitance C is proportional to a permittivity $\varepsilon$ in a general formula "$C=\varepsilon \times S/d$" representing the capacitance C when a dielectric having a thickness d and a relative permittivity $\varepsilon$ is present between parallel plates having an electrode plate area S, and from a relationship "$\varepsilon=\varepsilon r \times \varepsilon 0$". In the formula "$\varepsilon=\varepsilon r \times \varepsilon 0$", $\varepsilon$ is a permittivity of the dielectric, $\varepsilon r$ is a relative permittivity of the dielectric, and $\varepsilon 0$ is a permittivity of the vacuum.

In the heater device 80 of the first comparative example, a combined capacitance C0cw generated between the transmission electrode 30 and the reception electrode 40 when the water WT adheres to the heater surface 10a (that is, the combined capacitance C0cw when water adheres) is represented by following Formula F2 derived on the basis of above Formula F1.

$$C0cw=C1+C2=(83/3) \times C1 \ldots \quad (F2)$$

On the other hand, a combined capacitance C0 generated between the transmission electrode 30 and the reception electrode 40 when the water WT does not adhere to the heater surface 10a (that is, the combined capacitance C0 when no water adheres) in the heater device 80 of the first comparative example is represented by following Formula F3.

$$C0=C1 \ldots \quad (F3)$$

As can be seen by comparing the combined capacitances C0cw and C0 when water adheres and when no water adheres, in the heater device 80 in the first comparative example, the combined capacitance generated between the transmission electrode 30 and the reception electrode 40 significantly increases due to adhesion of the water WT to the heater surface 10a.

Figure 8:
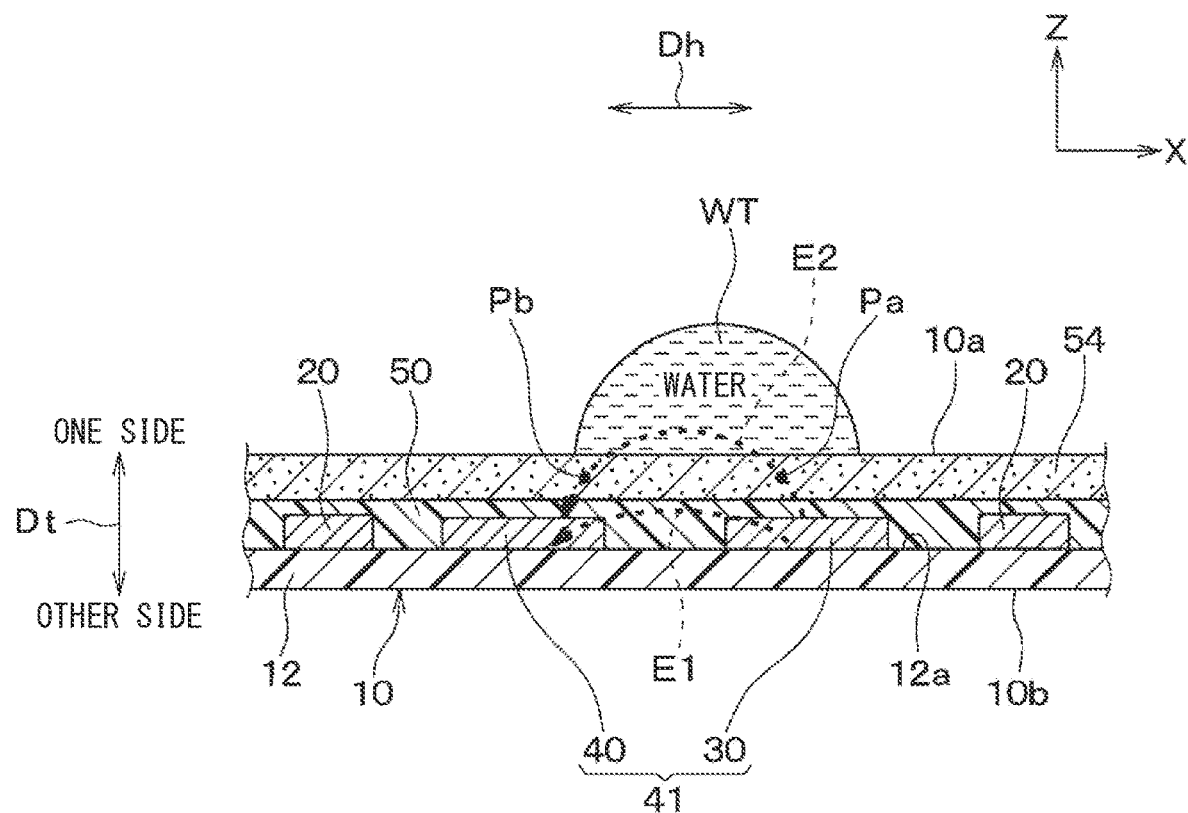
FIG. 8 is a view schematically illustrating a state where water adheres to the heater surface of the heater device of the first embodiment in a cross-section corresponding to FIG. 2.
Figure 9:
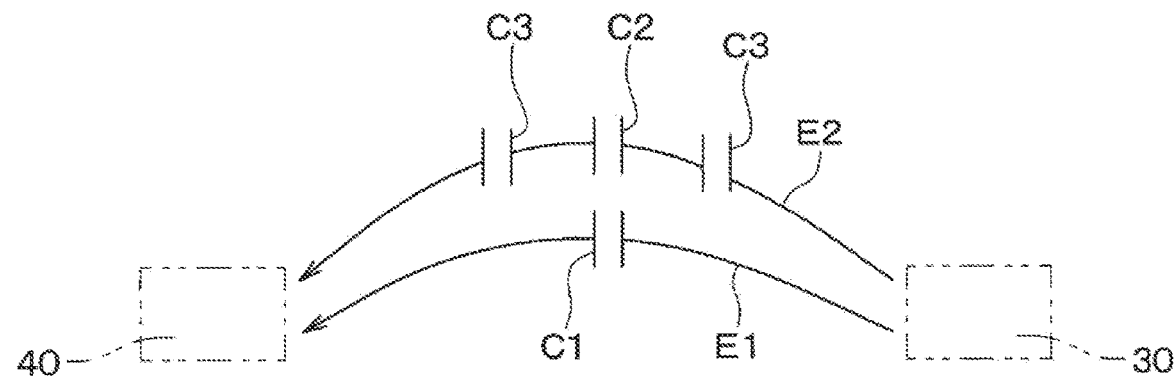
FIG. 9 is a schematic diagram representing a capacitance generated between the transmission electrode and the reception electrode in the heater device of the first embodiment illustrated in FIG. 8 in a state where water adheres.

On the other hand, the heater device 10 of the present embodiment includes the insulation coating layer 54 as described above. Thus, as illustrated in FIGS. 8 and 9, on the second electrical flux line E2 passing through the water WT, the water WT generates a capacitance C2, and the insulation coating layer 54 also generates a capacitance C3 at portions Pa and Pb across the water WT. In the present embodiment, in the first electrical flux line E1 passing through the insulating layer 50, the insulating layer 50 generates the capacitance C1 as in the first comparative example.

In this case, the relationship between the capacitance C1 of the insulating layer 50 and the capacitance C3 of the insulation coating layer 54 is represented by following Formula F4.

$$C3 = (1/3) \times C1 \ldots \quad (F4)$$

Above Formula F4 is derived under conditions that εr1 that is a relative permittivity εr of the insulating layer 50 is "εr1=approximately 3", and εr3 that is a relative permittivity εr of the air constituting the low relative permittivity part 542 of the insulation coating layer 54 is "εr3=approximately 1". Above Formula F4 is obtained by that, similarly to above Formula F1, the capacitance C is proportional to the permittivity ε in the general formula "C=ε×S/d", and from the relationship "ε=εr×ε0".

In the heater device 10 of the present embodiment, the combined capacitance C0w generated between the transmission electrode 30 and the reception electrode 40 when the water WT adheres to the heater surface 10a (that is, the combined capacitance C0w when water adheres) is represented by following Formula F5. Formula F6 below is derived from Formula F5 below, Formula F1 above, and Formula F4 above.

$$C0w = C1 + 1/(1/C2 + 2/C3) \ldots \quad (F5)$$

$$C0w = (563/483) \times C1 \ldots \quad (F6)$$

On the other hand, the combined capacitance C0 of the heater device 10 of the present embodiment when no water adheres is represented by above formula F3, as in the first comparative example.

As can be seen by comparing the combined capacitances C0w and C0 when water adheres and when no water adheres, in the heater device 10 of the present embodiment, the increase in combined capacitance due to adhesion of water WT on the heater surface 10a is significantly suppressed as compared with the first comparative example.

Figure 10:
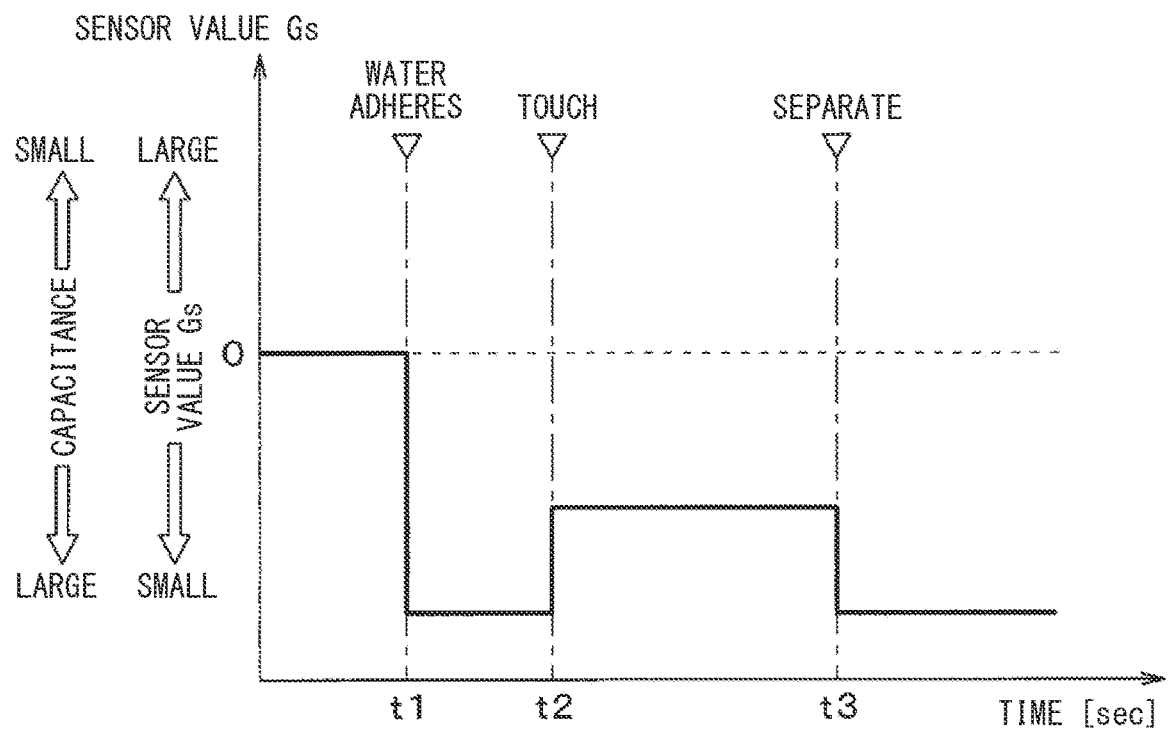
FIG. 10 is a time chart illustrating sensor values on a vertical axis in the first comparative example, when water adheres to a certain water adhesion point on the heater surface, and then an occupant comes into contact with a contact point different from the water adhesion point.
Figure 11:
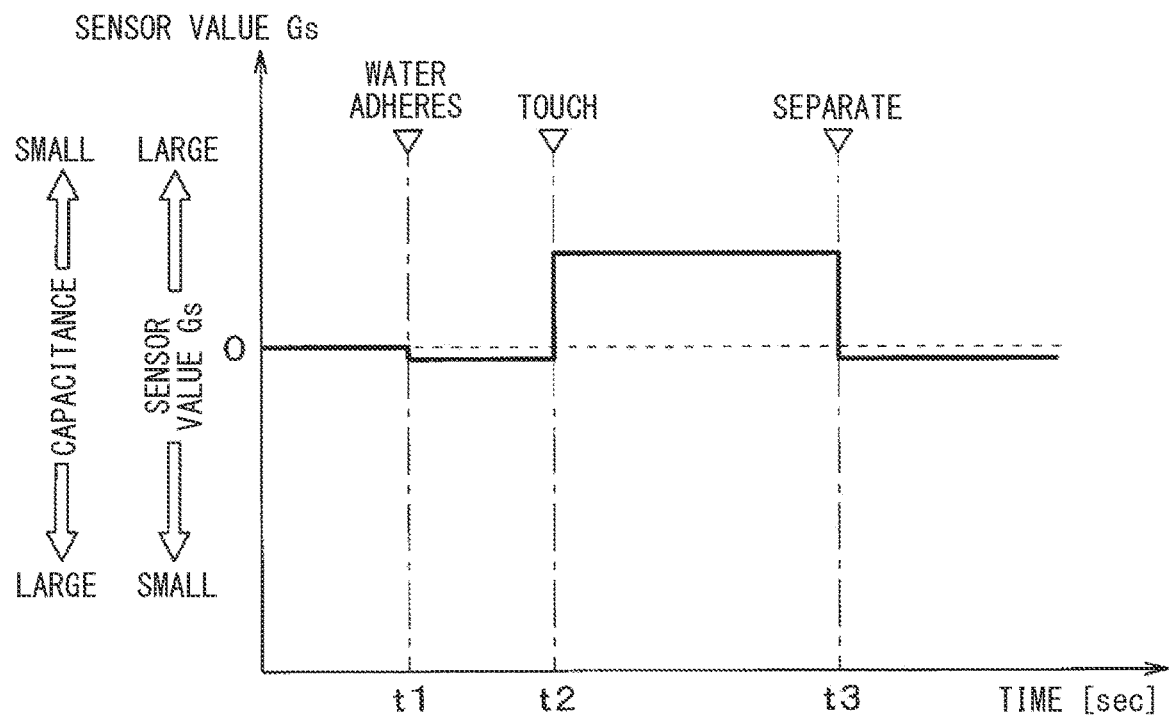
FIG. 11 is a time chart of the first embodiment, when water adheres to a certain water adhesion point on the heater surface, and then an occupant comes into contact with a contact point different from the water adhesion point.

As described above, there is a large difference between the first comparative example and the present embodiment in the change in the capacitance between the transmission electrode 30 and the reception electrode 40 when the water WT adheres, there is also a difference between FIGS. 10 and 11 illustrating a time chart at the time when the water WT adheres.

FIG. 10 is a time chart in the first comparative example, and FIG. 11 is a time chart of the present embodiment. Specifically, each of FIGS. 10 and 11 is a time chart when the water WT adheres to a certain water adhesion point Px (see FIG. 3) on the heater surface 10a, and then the occupant 2 comes into contact with a contact point Pth (see FIG. 3) different from the water adhesion point Px. In both FIGS. 10 and 11, a sensor value Gs is illustrated on the vertical axis.

Specifically, in both FIGS. 10 and 11, a time point t1 indicates a time point when the water WT adheres to the heater surface 10a, a time point t2 thereafter indicates a time point when the occupant 2 comes into contact with the heater surface 10a, and a time point t3 thereafter indicates a time point when the occupant 2 is separated from the heater surface 10a.

The sensor value Gs illustrated on the vertical axis of FIGS. 10 and 11 is an output value of the detection circuit 71 (see FIG. 4) that changes according to the capacitance between the transmission electrode 30 and the reception electrode 40. This sensor value Gs decreases as the capacitance between the transmission electrode 30 and the reception electrode 40 (specifically, the combined capacitance) increases. The "0" on the vertical axis of FIGS. 10 and 11 does not indicate zero of the capacitance between the transmission electrode 30 and the reception electrode 40, but indicates the "sensor value Gs=0".

As illustrated in FIG. 10, in the first comparative example, the sensor value Gs is significantly lowered due to adhesion of the water WT at the time point t1. Consequently, even if the occupant 2 comes into contact with the heater surface 10a at the time point t2, the sensor value Gs remains below the size before the time point t1. Thus, in the first comparative example, when the water WT adheres to the heater surface 10a, it is not possible to detect that the occupant 2 has come into contact with the heater surface 10a.

On the other hand, in the present embodiment, as illustrated in FIG. 11, the sensor value Gs slightly decreases due to adhesion of the water WT at the time point t1, but it is maintained at substantially the same size as compared to that before the time point t1. Consequently, when the occupant 2 comes into contact with the heater surface 10a at the time point t2, the sensor value Gs increases with a sufficient difference from the size before the time point t1. When the occupant 2 is separated from the heater surface 10a at the time of t3, the size is returned to substantially the same size as that before the time point t1. Thus, in the present embodiment, even if the water WT adheres to the heater surface 10a, it is possible to detect that the occupant 2 has come into contact with the heater surface 10a. It is possible to detect that the occupant 2 who has been in contact with the heater surface 10a is separated from the heater surface 10a.

As described above, according to the present embodiment, as illustrated in FIGS. 2 and 5, the heater device 10 includes the insulation coating layer 54. The insulation coating layer 54 has the high relative permittivity part 541 formed by the insulating member 541a having an electrical insulating property, and the low relative permittivity part 542 having a smaller relative permittivity εr than that of the high relative permittivity part 541. The low relative permittivity part 542 is located between at least one of the transmission electrode 30 or the reception electrode 40 and the heater surface 10a.

Thus, as illustrated in FIGS. 5 and 8, the low relative permittivity part 542 is arranged so as to block the second electrical flux line E2 flying between the transmission electrode 30 and the reception electrode 40. That is, when the water WT adheres to the heater surface 10a, the low relative permittivity part 542 generates a capacitance in series with the water WT on the heater surface 10a on the second electrical flux line E2. Therefore, for example, as compared with the first comparative example of FIG. 6 in which the insulation coating layer 54 is not provided, the low relative permittivity part 542 operates to suppress a change width of the capacitance between the transmission electrode 30 and the reception electrode 40 that increases due to adhesion of the water WT to the heater surface 10a.

Therefore, as described above with reference to FIGS. 6 to 11, in the present embodiment, it is possible to suppress the undetectable contact or proximity of the object to the heater surface 10a due to adhesion of the water WT, as compared with the first comparative example.

According to the present embodiment, as illustrated in FIG. 2, the heater device 10 includes an insulating layer 50, and the insulating layer 50 is stacked between the insulation coating layer 54 and each of the transmission electrode 30 and the reception electrode 40 and has an electrical insulating property. The volume ratio of the component of the low relative permittivity part 542 in the insulating layer 50 is smaller than the volume ratio of the component of the low relative permittivity part 542 in the insulation coating layer 54.

Therefore, the insulating layer 50 is easier to secure the electrical insulating property against the heat generation part 20, the transmission electrode 30, and the reception electrode 40 than the insulation coating layer 54. If the electrical insulating property against the heat generation part 20, the transmission electrode 30, and the reception electrode 40 is sufficiently secured by the insulating layer 50, it is not necessary to require a high insulating property in the insulation coating layer 54. Thus, it is easy to enhance the function of the insulation coating layer 54 to reduce the influence of water adhesion as compared with a case where the insulating layer 50 is not provided.

According to the present embodiment, as illustrated in FIGS. 2 and 5, the low relative permittivity part 542 included in the insulation coating layer 54 is formed by air. Therefore, it is possible to reduce the relative permittivity εr of the low relative permittivity part 542 with a simple configuration. Since the relative permittivity εr of air is about "εr=1" and the relative permittivity εr of air is theoretically the smallest, the effect that the change in the capacitance between the transmission electrode 30 and the reception electrode 40 due to adhesion of the water WT is decreased most can be expected.

According to the present embodiment, the insulation coating layer 54 is formed by the foamed resin, and the insulating member 541a forming the high relative permittivity part 541 in the insulation coating layer 54 is the resin material in the foamed resin. The low relative permittivity part 542 in the insulation coating layer 54 is formed by air included as bubbles in the foamed resin. Therefore, it is possible to reduce the relative permittivity εr of the low relative permittivity part 542 while making the insulation coating layer 54 a simple structure.

The air itself produces a heat insulating effect, but the insulating member 541a, which is the resin material in the foamed resin, plays a role in transferring heat generated in the heater device 10 (specifically, heat generated by the heat generation part 20) to the heater surface 10a. That is, the heater surface 10a is thermally conductively connected to the heat generation part 20 by an object other than air (specifically, the insulating member 541a and the insulating layer 50). Thus, in the heater device 10, heat can be transferred satisfactorily through the insulation coating layer 54. Therefore, it is possible to form the low relative permittivity part 542 with air without significantly deteriorating heat dissipation performance of the heater device 10.

Moreover, the insulation coating layer 54 can be provided so that temperature lowering performance to rapidly lower the temperature of the heater surface 10a when the occupant 2 comes into contact with the heater surface 10a is not significantly deteriorated by the insulation coating layer 54.

Second Embodiment

Next, a second embodiment will be described. In the present embodiment, differences from the above-described first embodiment will be mainly described. Parts that are the same as or equivalent to those in the above-described embodiment will be omitted or simplified. The same applies to the description of the embodiments as described later.

Figure 12:
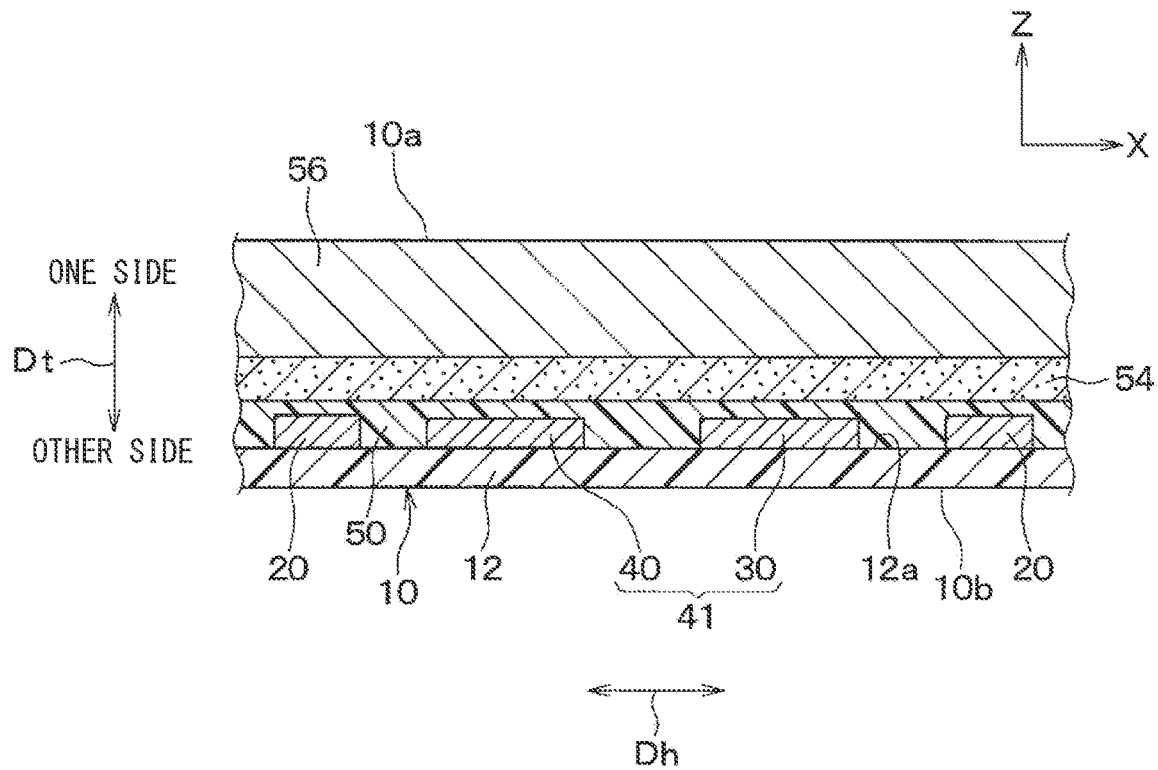
FIG. 12 is a cross-sectional view illustrating a cross section of a part of the heater device cut along a plane along the thickness direction of a heater device in a second embodiment.

As illustrated in FIG. 12, the heater device 10 of the present embodiment further includes a design layer 56 in addition to the configuration of the heater device 10 of the first embodiment. In this respect, the present embodiment is different from the first embodiment.

Specifically, the design layer 56 of the heater device 10 of the present embodiment is formed by a sheet-shaped design member having design properties. For example, the design member may be a fabric, cloth, leather, or the like used in the interior of a vehicle.

The design layer 56 is stacked on one side in the heater thickness direction Dt with respect to the insulation coating layer 54, and is joined to the insulation coating layer 54 by, for example, bonding or the like. Since the design layer 56 is an outermost layer of the heater device 10 on one side in the heater thickness direction Dt, the surface of one side of the design layer 56 in the heater thickness direction Dt is the heater surface 10a. For example, the design layer 56 is stacked on the insulation coating layer 54 so as to cover the insulation coating layer 54 over the entire insulation coating layer 54.

In the present embodiment, the heater surface 10a is not formed on the insulation coating layer 54, but if the positional relationship between the insulation coating layer 54 and the heater surface 10a is mentioned, it can be said that the heater surface 10a is formed on one side of the insulation coating layer 54 in the heater thickness direction Dt.

Since the design layer 56 is provided in this manner, it is possible to improve the appearance of the heater device 10, in other words, the design of the heater device 10 in the installed state where the heater device 10 is installed in, for example, the vehicle interior.

Since the heater surface 10a is formed not on the insulation coating layer 54 but on the design layer 56, there is a merit that it is not necessary to require the insulation coating layer 54 to have a design property.

Figure 13:
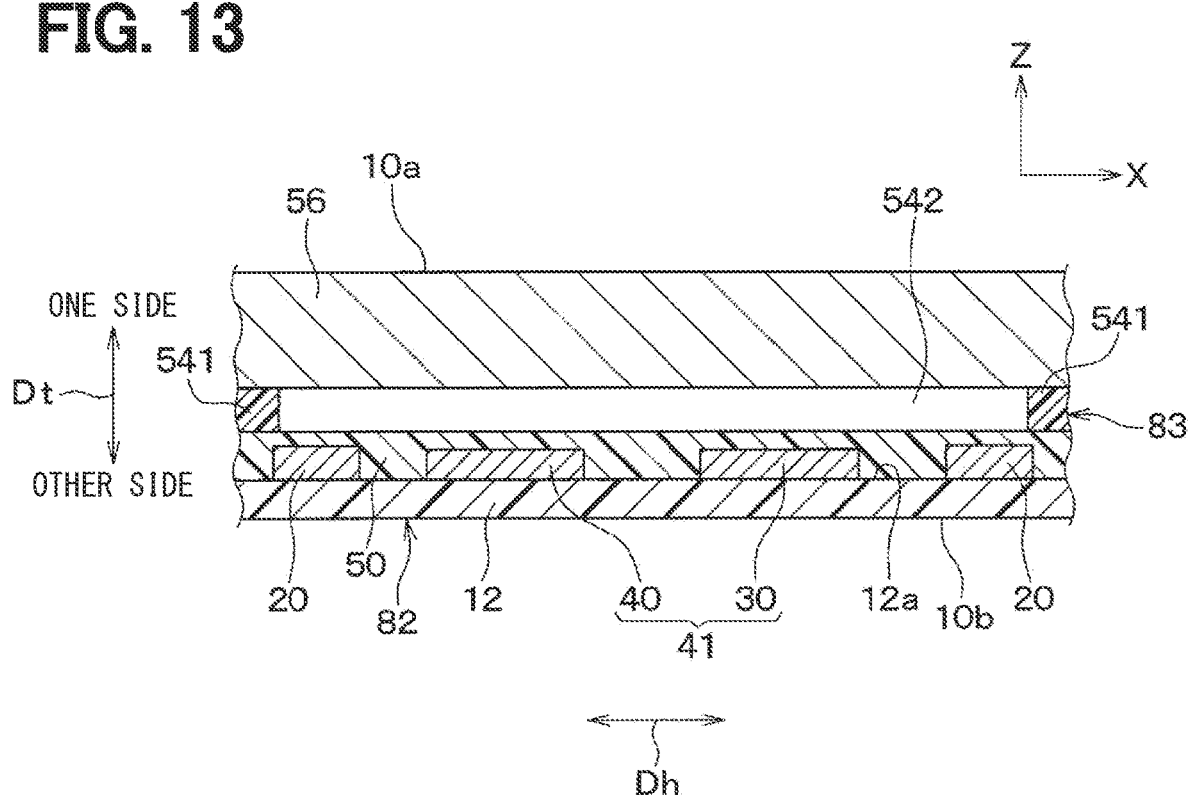
FIG. 13 is a cross-sectional view illustrating a cross section of a part of the heater device cut along a plane along the thickness direction of a heater device in a second comparative example.

Here, a second comparative example to be compared with the present embodiment will be described with reference to FIG. 13. As illustrated in FIG. 13, the heater device 82 of the second comparative example includes an insulation coating layer 83 different from the insulation coating layer 54 of the present embodiment. The insulation coating layer 83 of the second comparative example has a high relative permittivity part 541 and a low relative permittivity part 542, similarly to the insulation coating layer 54 of the present embodiment. However, in the insulation coating layer 83 of the second comparative example, the high relative permittivity part 541 is configured as a plurality of spacers arranged between the insulating layer 50 and the design layer 56, and an air layer formed by the spacers is the low relative permittivity part 542. That is, a large portion of the insulation coating layer 83 of the second comparative example is occupied by the low relative permittivity part 542, which is an air layer. Except for this point, the heater device 82 of the second comparative example is the same as the heater device 10 of the present embodiment.

In the heater device 82 of the second comparative example, the thermal conductivity λ of air is about "λ=0.02 W/mK", and since this thermal conductivity λ of air is small, the low relative permittivity part 542 that is an air layer greatly hinders heat transfer from the heat generation part 20 to the heater surface 10a.

On the other hand, in the heater device 10 of the present embodiment, the insulation coating layer 54 is formed by a foamed resin, and the low relative permittivity part 542 is formed by air included as bubbles in the foamed resin, as in the first embodiment. Therefore, the heat insulating effect of the low relative permittivity part 542 of the present embodiment can be suppressed to be smaller than that in the second comparative example. Since the design layer 56 and the insulation coating layer 54 are entirely bonded to each other, heat is appropriately transferred from the heat generation part 20 to the heater surface 10a, the temperature of the design layer 56 easily rises, and radiant heat can be radiated from the heater surface 10a.

The present embodiment is similar to the first embodiment except for the above description. In the present embodiment, effects exhibited by components common to the above-described first embodiment can be obtained as in the first embodiment.

Third Embodiment

Next, a third embodiment will be described. In the present embodiment, differences from the above-described second embodiment will be mainly described.

Figure 14:
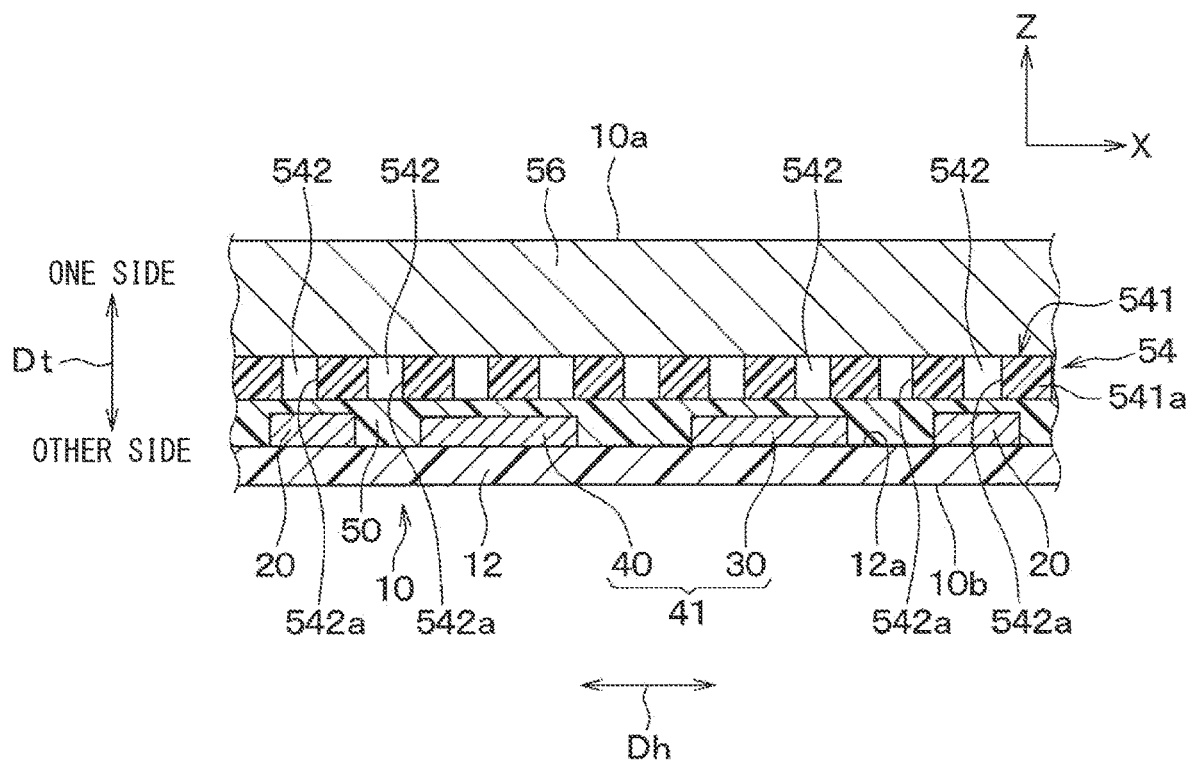
FIG. 14 is a cross-sectional view illustrating a cross section of a part of the heater device cut along a plane along the thickness direction of a heater device in a third embodiment.

As illustrated in FIG. 14, in the present embodiment, the structure of the insulation coating layer 54 is different from that in the second embodiment.

Specifically, the insulation coating layer 54 of the present embodiment is formed by a perforated resin film. Therefore, the insulating member 541a constituting the high relative permittivity part 541 is a resin material constituting the resin film. The low relative permittivity part 542 is formed by air in a plurality of film holes 542a formed in the resin film.

For example, the plurality of film holes 542a penetrates the insulation coating layer 54 in the heater thickness direction Dt. The plurality of film holes 542a is arranged so as to be evenly dispersed along the insulation coating layer 54. Therefore, also in this embodiment, the low relative permittivity part 542 is evenly dispersed in the insulation coating layer 54.

Since the insulation coating layer 54 of the present embodiment is as described above, the distribution of the low relative permittivity part 542 can be arbitrarily set according to perforation positions in the resin film constituting the insulation coating layer 54.

Thus, as compared with a case where the insulation coating layer 54 is formed by, for example, a foamed resin, there is a merit as follows. That is, there is a merit that the low relative permittivity part 542, which is air, does not easily hinder heat transfer from the heat generation part 20 to the heater surface 10a, and it is easy to set the distribution of the low relative permittivity part 542 so that the low relative permittivity part 542 effectively suppresses changes in the capacitance between the electrodes 30 and 40 due to water adhesion.

The present embodiment is similar to the second embodiment except for the above description. In the present embodiment, effects exhibited by components common to the above-described second embodiment can be obtained as in the second embodiment.

Although the present embodiment is a modification based on the second embodiment, the present embodiment can be combined with the above-described first embodiment.

Fourth Embodiment

Next, a fourth embodiment will be described. In the present embodiment, differences from the above-described first embodiment will be mainly described.

Figure 15:
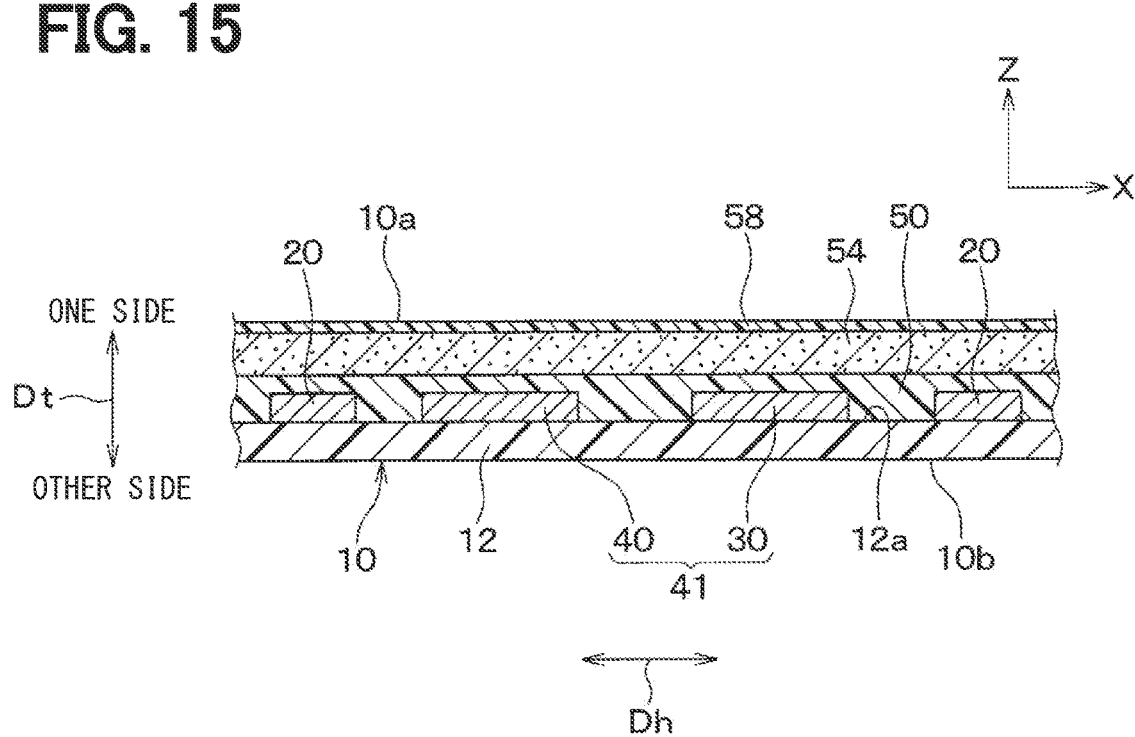
FIG. 15 is a cross-sectional view illustrating a cross section of a part of the heater device cut along a plane along the thickness direction of a heater device in a fourth embodiment.

As illustrated in FIG. 15, the heater device 10 of the present embodiment further includes a waterproof layer 58 in addition to the configuration of the heater device 10 of the first embodiment. In this respect, the present embodiment is different from the first embodiment.

Specifically, the waterproof layer 58 of the heater device 10 of the present embodiment is stacked on one side in the heater thickness direction Dt with respect to the insulation coating layer 54, and is joined to the insulation coating layer 54. The waterproof layer 58 prevents water WT from penetrating from the heater surface 10a to the insulation coating layer 54.

For example, the waterproof layer 58 has waterproof and moisture proof properties. The waterproof layer 58 may be, for example, a moisture-proof sheet bonded to the insulation coating layer 54, or may be a moisture-proof coating applied and solidified on the insulation coating layer 54.

Since the waterproof layer 58 is an outermost layer of the heater device 10 on one side in the heater thickness direction Dt, a surface of one side of the waterproof layer 58 in the heater thickness direction Dt is the heater surface 10a. For example, the waterproof layer 58 is stacked on the insulation coating layer 54 so as to cover the insulation coating layer 54 over the entire insulation coating layer 54.

Since the waterproof layer 58 is provided in this manner, even if the insulation coating layer 54 does not have waterproof and moisture proof properties, it is possible to prevent water WT from seeping into the insulation coating layer 54, which is a foamed resin, from the heater surface 10a. Consequently, it is possible to cause the insulation coating layer 54 to always exert the effect of suppressing increase in the capacitance between the transmission electrode 30 and the reception electrode 40 due to adhesion of water WT to the heater surface 10a.

The present embodiment is similar to the first embodiment except for the above description. In the present embodiment, effects exhibited by components common to the above-described first embodiment can be obtained as in the first embodiment.

Although the present embodiment is a modification based on the first embodiment, the present embodiment can be combined with the second embodiment or the third embodiment described above.

Fifth Embodiment

Next, a fifth embodiment will be described. In the present embodiment, differences from the above-described first embodiment will be mainly described.

Figure 16:
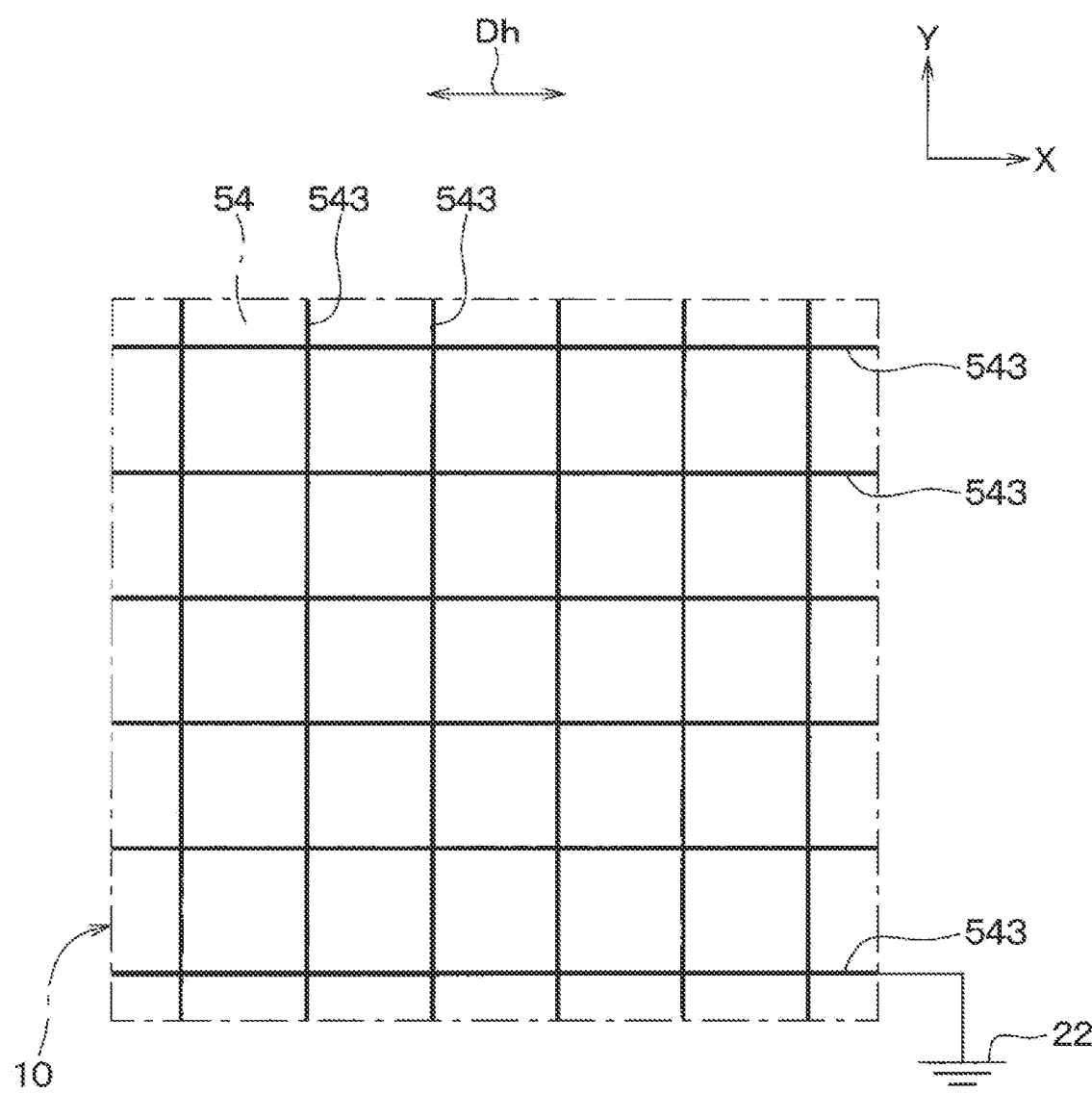
FIG. 16 is a diagram schematically illustrating a plurality of ground wires included in an insulation coating layer as viewed in a direction facing a heater surface of a heater device in a fifth embodiment.
Figure 17:
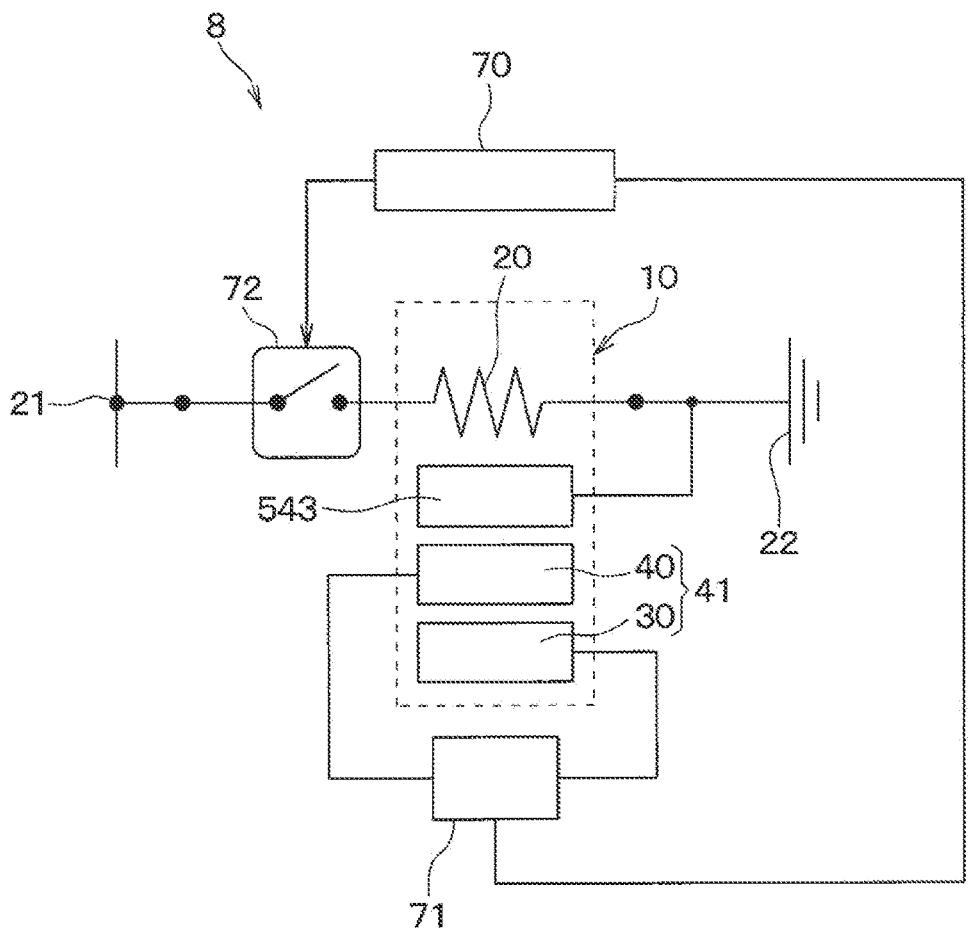
FIG. 17 is a circuit diagram including a heater device, a detection circuit, and a control device in the fifth embodiment.

In this embodiment as well as in the first embodiment, the insulation coating layer 54 is formed by a foamed resin. However, as illustrated in FIGS. 16 and 17, the insulation coating layer 54 of the present embodiment has a plurality of ground wires 543.

Specifically, the plurality of ground wires 543 is connected to each other so as to have the same potential as each other, and is electrically connected to the ground 22. Thus, the plurality of ground wires 543 has the same potential as the ground potential of the detection circuit 71.

For example, the plurality of ground wires 543 is arranged in a grid shape in the insulation coating layer 54. Therefore, the plurality of ground wires 543 in a grid shape is arranged so as to overlap with each of the transmission electrode 30 and the reception electrode 40 on one side in the heater thickness direction Dt.

The plurality of ground wires 543 is arranged so as to be distributed inside the insulation coating layer 54 at a predetermined density (that is, a predetermined ground wire density). Here, the denser the plurality of ground wires 543 is distributed, the greater the effect of suppressing the increase in the capacitance between the electrodes 30 and 40 due to water adhesion, but the lower the function of detecting contact or proximity of an object (in other words, sensitivity) on the basis of the change in the capacitance between the electrodes 30 and 40. Accordingly, the ground wire density is experimentally determined in advance so that the function of detecting contact or proximity of an object can be practically obtained, and the effect of suppressing increase in the capacitance between the electrodes 30 and 40 due to water adhesion can be obtained.

Since such a plurality of ground wires 543 is provided, the intersection of the electrical flux line E (see FIG. 2) flying between the transmission electrode 30 and the reception electrode 40 and the water WT adhering to the heater surface 10*a* is suppressed by the ground wires 543. Consequently, it is possible to suppress an increase in the capacitance between the electrodes 30 and 40 due to water adhesion.

The present embodiment is similar to the first embodiment except for the above description. In the present embodiment, effects exhibited by components common to the above-described first embodiment can be obtained as in the first embodiment.

Although the present embodiment is a modification based on the first embodiment, the present embodiment can be combined with any of the above-described second to fourth embodiments.

Sixth Embodiment

Next, a sixth embodiment will be described. In the present embodiment, differences from the above-described first embodiment will be mainly described.

Figure 18:
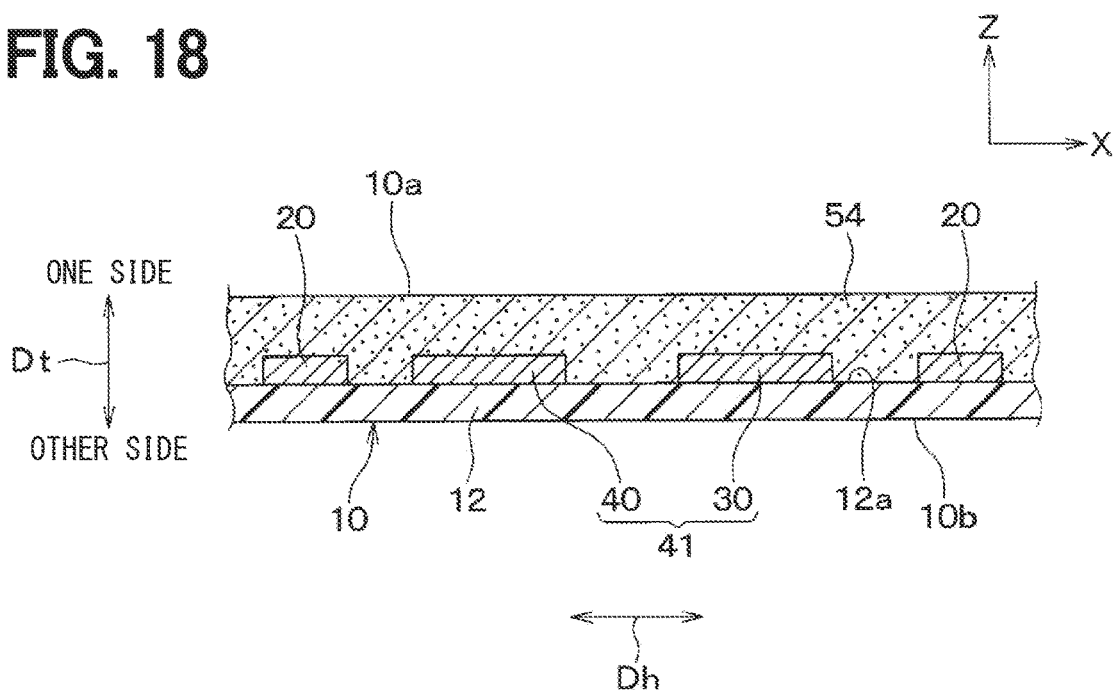
FIG. 18 is a cross-sectional view illustrating a cross section of a part of the heater device cut along a plane along the thickness direction of a heater device in a sixth embodiment.

As illustrated in FIG. 18, the heater device 10 of the present embodiment does not include the insulating layer 50 (see FIG. 2). Therefore, the insulation coating layer 54 of the present embodiment is provided to come into contact with the heat generation part 20, the transmission electrode 30, and the reception electrode 40, and to cover the heat generation part 20, the transmission electrode 30, and the reception electrode 40 on the one-side substrate surface 12*a*.

The present embodiment is similar to the first embodiment except for the above description. In the present embodiment, effects exhibited by components common to the above-described first embodiment can be obtained as in the first embodiment.

Although the present embodiment is a modification based on the first embodiment, the present embodiment can be combined with any of the above-described second to fifth embodiments.

Other Embodiments (1) In each of the above-described embodiments, the heat generation part 20 that is arranged to be folded back at predetermined intervals on the surface of the insulating substrate 12 has been described, but the method of arranging the heat generation parts 20 is not limited to this. Various arrangement methods can be employed for the heat generation part 20.

(2) In the first embodiment described above, as illustrated in FIG. 2, the insulation coating layer 54 is stacked on the insulating layer 50 and joined to the insulating layer 50 with a resin adhesive or the like, but the joining method is not limited to this. For example, the insulation coating layer 54 may be fused to the insulating layer 50.

(3) In each of the above-described embodiments, as illustrated in FIGS. 2 and 5, the low relative permittivity part 542 included in the insulation coating layer 54 is located between each of the transmission electrode 30 and the reception electrode 40 and the heater surface 10*a*, but this is an example. While such an arrangement is preferable, for example, the low relative permittivity part 542 is located between one of the transmission electrode 30 and the reception electrode 40 and the heater surface 10*a*, but it is also conceivable that the low relative permittivity part 542 is not located between the other thereof and the heater surface 10*a*. In short, the low relative permittivity part 542 may be located between at least one of the transmission electrode 30 or the reception electrode 40 and the heater surface 10*a*.

(4) In the first embodiment described above, as illustrated in FIGS. 2 and 5, the low relative permittivity part 542 is formed by air, but this is an example. As long as the low relative permittivity part 542 is formed by a component having a relative permittivity εr smaller than that of the insulating member 541*a* of the high relative permittivity part 541, it is conceivable that the low relative permittivity part 542 is formed by a component other than air. This is because, even in this manner, a component having a relative permittivity εr smaller than that of the insulating member 541*a* of the high relative permittivity part 541 is arranged so as to block the second electrical flux line E2 between the transmission electrode 30 and the reception electrode 40 (see FIG. 8).

(5) The insulation coating layer 54 included in the heater device 10 of the second embodiment described above is formed by a foamed resin as in the first embodiment, but the insulation coating layer 54 itself may be provided with a function of joining the design layer 56 and the insulating layer 50. That is, in the second embodiment, the insulation coating layer 54 may be formed by a foamed adhesive including air as bubbles. In such a case, the insulating member 541*a* of the high relative permittivity part 541 is the resin material in the foamed adhesive material, and the low relative permittivity part 542 is formed by air included as bubbles in the foamed adhesive material. Examples of the resin material constituting the foamed adhesive can include acrylic resin, silicon resin, and the like.

(6) In the above description of the first embodiment, the structure of bubbles in the foamed resin constituting the insulation coating layer 54 is not mentioned, but the foamed resin may have a closed cell structure (in other words, a single bubble structure). With this structure, it is possible to prevent the water WT from seeping from the heater surface 10*a* through the bubbles of the foamed resin to the inside of the insulation coating layer 54 that is the foamed resin. Consequently, it is possible to cause the insulation coating layer 54 to always exert the effect of suppressing increase in the capacitance between the transmission electrode 30 and the reception electrode 40 due to adhesion of water WT to the heater surface 10a. FIG. 5 schematically illustrates the closed cell structure of the foamed resin.

(7) In each of the above-described embodiments, for example, as illustrated in FIGS. 2 and 5, the insulation coating layer 54 is formed by a foamed resin and does not include a material having a higher thermal conductivity than the insulating member 541a, but this is an example. For example, the insulation coating layer 54 may be formed by a material having a higher thermal conductivity than that of the insulating member 541a (that is, a high thermal conductive material). Furthermore, it is preferable that the high thermal conductive material has a relative permittivity εr lower than that of the insulating member 541a.

Thus, as compared with a case where the insulation coating layer 54 suppresses the increase in the capacitance between the electrodes 30 and 40 due to adhesion of water to the heater surface 10a, and the high thermal conductive material is not included in the insulation coating layer 54, heat of the heat generation part 20 is easily transferred to the heater surface 10a.

(8) In each of the above-described embodiments, for example, as illustrated in FIG. 2, the transmission electrode 30, the reception electrode 40, and the heat generation part 20 are arranged on the one-side substrate surface 12a and side by side with each other in a direction along the one side substrate surface 12a, but this is an example. The transmission electrode 30, the reception electrode 40, and the heat generation part 20 do not need to be aligned on the one-side substrate surface 12a, and their arrangement can be considered in various ways.

(9) In each of the above-described embodiments, for example, as illustrated in FIG. 2, the heater device 10 has an insulating substrate 12 on the farthest other side of the heater device 10 in the heater thickness direction Dt, but it is also conceivable that the heat device 10 does not include the insulating substrate 12. For example, in the dashboard 7 of FIG. 1, a heater installation portion where the heater device 10 is installed may function as a substitute for the insulating substrate 12.

(10) The present disclosure is not limited to the above-described embodiment, and can be implemented in various modifications. The above-described embodiments are not unrelated to each other, and can be appropriately combined unless the combination is clearly impossible.

In each of the above-described embodiments, it goes without saying that the elements constituting the embodiment are not necessarily essential except when it is clearly stated that they are particularly essential, and when they are clearly considered to be essential in principle, and the like. In each of the above-described embodiments, when numerical values such as the number, numerical values, quantities, and ranges of the constituent elements of the embodiment are mentioned, it is not limited to the specific numbers except when it is clearly stated that they are particularly essential, and when they are clearly limited to a specific number in principle, and the like.

In each of the above-described embodiments, when referring to the material, shape, positional relationship, and the like of the constituent elements and the like, the constituent elements and the like are not limited to the material, shape, positional relationship, and the like except when specifically indicated and when limited in principle to a specific material, shape, positional relationship, and the like.

Summary

According to a first aspect illustrated in part or all of the above-described embodiments, a heater device has a heater surface facing one side in a predetermined direction and is configured to radiate heat from the heater surface. The heater device includes an insulation coating layer that covers a transmission electrode and a reception electrode on the one side in the predetermined direction with respect to the transmission electrode and the reception electrode. The insulation coating layer has a first component part made of an insulating member having an electrical insulating property, and a second component part having a smaller relative permittivity than a relative permittivity of the first component part. The second component part is located between at least one of the transmission electrode or the reception electrode and the heater surface.

According to a second aspect, the heater device includes an insulating layer, and the insulating layer is stacked between the insulation coating layer and the transmission electrode and the reception electrode and has an electrical insulating property. A volume ratio of a component of the second component part in the insulating layer is smaller than a volume ratio of a component of the second component part in the insulation coating layer. Therefore, if the electrical insulating property between the transmission electrode and the reception electrode is sufficiently ensured by the insulating layer, it is not necessary to require a high insulating property in the insulation coating layer. Thus, it is easy to enhance the function of the insulation coating layer to reduce influence of water adhesion as compared with a case where there is no insulating layer.

According to a third aspect, the second component part is made of air. Therefore, it is possible to reduce the relative permittivity of the second component part with a simple structure.

According to a fourth aspect, the insulation coating layer is made of a foamed resin or a foamed adhesive, the insulating member is a resin material in the foamed resin or the foamed adhesive, and the second component part is formed by air included as bubbles in the foamed resin or the foamed adhesive. Therefore, it is possible to reduce the relative permittivity of the second component part while making the insulation coating layer a simple structure. The air itself produces a heat insulating effect, but the resin material in the foamed resin or the foamed adhesive material plays a role of transferring the heat generated in the heater device to the heater surface. That is, it is possible to transfer heat satisfactorily through the insulation coating layer. Thus, it is possible to form the second component part with air without significantly deteriorating heat dissipation performance of the heater device.

According to a fifth aspect, the insulation coating layer is made of a perforated resin film, the insulating member is a resin material constituting the resin film, and the second component part is formed by air in a hole formed in the resin film. With this structure, the distribution of the second component part can be arbitrarily set according to the perforation positions in the resin film. Thus, as compared with the case where the insulation coating layer is formed by, for example, a foamed resin, the second component part is less likely to hinder heat transfer to the heater surface, and it is easy to set a distribution of the second component part so that the second component part effectively suppresses changes in the capacitance due to water adhesion.

According to a sixth aspect, the heater device includes a waterproof layer. The waterproof layer is stacked on the one side in the predetermined direction with respect to the insulation coating layer and prevents water from penetrating from the heater surface to the insulation coating layer. Therefore, even if the insulation coating layer does not have waterproof and moisture proof properties, it is possible to prevent water from seeping into the insulation coating layer from the heater surface. Consequently, it is possible to cause the insulation coating layer to always exert the effect of suppressing increase in the capacitance between the transmission electrode and the reception electrode due to adhesion of water to the heater surface.

According to a seventh aspect, the insulation coating layer includes a material having a higher thermal conductivity than a thermal conductivity of the insulating member. Therefore, as compared with a case where the material having a high thermal conductivity is not included in the insulation coating layer while the increase in the capacitance between the transmission electrode and the reception electrode due to water adhesion to the heater surface is suppressed by the insulation coating layer, heat is easily transferred to the heater surface inside the heater device.

According to an eighth aspect, the insulation coating layer has a ground wire connected to ground. Therefore, an intersection of the electrical flux line flying between the transmission electrode and the reception electrode and the water adhering to the heater surface is suppressed by the ground wire, and it is possible to suppress increase in the capacitance between the transmission electrode and the reception electrode due to water adhesion.

What is claimed is:

1. A heater device having a heater surface facing one side in a predetermined direction and configured to radiate heat from the heater surface, the heater device comprising:
   a transmission electrode and a reception electrode arranged on the other side in the predetermined direction with respect to the heater surface;
   an insulation coating layer that covers the transmission electrode and the reception electrode on the one side in the predetermined direction with respect to the transmission electrode and the reception electrode; and
   a substrate having a surface facing toward the heater surface, the transmission electrode and the reception electrode being disposed on the surface of the substrate, wherein
   the transmission electrode and the reception electrode are electrically connected to a contact detection unit that is configured to detect a contact or a proximity of an object to the heater surface by a change in a capacitance between the transmission electrode and the reception electrode,
   the insulation coating layer has a first component part made of an insulating member having an electrical insulating property, and a second component part having a relative permittivity smaller than a relative permittivity of the first component part, and
   the second component part is located between the heater surface and at least one of the transmission electrode or the reception electrode.

2. The heater device according to claim 1, further comprising
   an insulating layer that is stacked between the insulation coating layer and a layer of the transmission electrode and the reception electrode, and has an electrical insulating property,
   wherein a volume ratio of a component of the second component part in the insulating layer is smaller than a volume ratio of a component of the second component part in the insulation coating layer.

3. The heater device according to claim 1, wherein the second component part is made of air.

4. The heater device according to claim 1, wherein
   the insulation coating layer is made of a foamed resin or a foamed adhesive,
   the insulating member of the first component part is a resin material in the foamed resin or the foamed adhesive, and
   the second component part is made of air as bubbles included in the foamed resin or the foamed adhesive of the insulating member of the first component part.

5. The heater device according to claim 1, wherein
   the insulation coating layer is made of a perforated resin film,
   the insulating member of the first component part is a resin material constituting the resin film, and
   the second component part is made of air in a hole formed in the resin film.

6. The heater device according to claim 1, further comprising
   a waterproof layer stacked on the one side in the predetermined direction with respect to the insulation coating layer, and configured to prevent water from penetrating from the heater surface to the insulation coating layer.

7. The heater device according to claim 1, wherein the insulation coating layer includes a material having a thermal conductivity higher than a thermal conductivity of the insulating member.

8. The heater device according to claim 1, wherein the insulation coating layer has a ground wire connected to ground.

9. The heater device according to claim 1, wherein the second component part is arranged to block an electrical flux line between the transmission electrode and the reception electrode.

10. The heater device according to claim 1 further comprising
    a heat generator that is a heat source of the heater device, wherein
    the transmission electrode, the reception electrode, and the heat generator are disposed on the same top surface of the substrate.

11. The heater device according to claim 10, wherein
    the second component part of the insulation coating layer is located between the heater surface, and the transmission electrode and the reception electrode in the predetermined direction.

12. The heater device according to claim 10 further comprising
    an insulating layer having an electrical insulating property, and disposed between the substrate and the insulation coating layer to cover the transmission electrode, the reception electrode, and the heat generator, and
    the insulating layer is not formed by a formed resin.

13. The heater device according to claim 12 further comprising
    a design layer disposed on the insulation coating layer, the design layer being visible from an interior of a vehicle.

14. The heater device according to claim 1, wherein
    the second component part of the insulation coating layer is located between the heater surface and the transmission electrode in the predetermined direction.

* * * * *